(12) United States Patent
Wang et al.

(10) Patent No.: US 9,981,384 B2
(45) Date of Patent: May 29, 2018

(54) MECHANICAL ARM AND PICKUP DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Jian Wang, Beijing (CN); Bin Chang, Beijing (CN); Lizhu Yu, Beijing (CN); Lei Xiang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 420 days.

(21) Appl. No.: 14/803,148

(22) Filed: Jul. 20, 2015

(65) Prior Publication Data

US 2016/0131545 A1 May 12, 2016

(30) Foreign Application Priority Data

Nov. 7, 2014 (CN) .......................... 2014 1 0643706

(51) Int. Cl.
*B25J 9/00* (2006.01)
*B25J 9/16* (2006.01)
*G01L 5/22* (2006.01)

(52) U.S. Cl.
CPC ............. *B25J 9/1676* (2013.01); *G01L 5/226* (2013.01); *Y10S 901/02* (2013.01); *Y10S 901/27* (2013.01); *Y10S 901/46* (2013.01)

(58) Field of Classification Search
CPC ................................ B25J 9/1676; G01L 5/226
See application file for complete search history.

(56) References Cited

U.S. PATENT DOCUMENTS

| | | | | | |
|---|---|---|---|---|---|
| 4,973,215 A | * | 11/1990 | Karlen | ....................... | B25J 9/04 414/729 |
| 7,720,322 B2 | * | 5/2010 | Prisco | ..................... | G01L 1/246 385/12 |
| 2008/0022790 A1 | * | 1/2008 | Lee | ......................... | G01C 19/42 74/5.4 |
| 2012/0210817 A1 | * | 8/2012 | Kassow | ............... | B25J 19/0004 74/490.03 |
| 2012/0279342 A1 | * | 11/2012 | Yasukawa | ............ | B25J 15/0009 74/490.03 |

(Continued)

FOREIGN PATENT DOCUMENTS

| CN | 1321447 C | 6/2007 |
|---|---|---|
| CN | 101450752 A | 6/2009 |

(Continued)

OTHER PUBLICATIONS

Office Action dated Jan. 15, 2016 issued in corresponding Chinese Application No. 201410643706.X.

*Primary Examiner* — David M Fenstermacher
(74) *Attorney, Agent, or Firm* — Nath, Goldberg & Meyer; Joshua B. Goldberg

(57) ABSTRACT

The present invention provides a mechanical arm and a pickup device. The mechanical arm includes a mechanical arm body and a pressure sensing system. The pressure sensing system is fixedly connected with the mechanical arm body, for sensing whether the mechanical arm body is to be collided with a picked-up object.

18 Claims, 2 Drawing Sheets

(56) References Cited

U.S. PATENT DOCUMENTS

| | | | | |
|---|---|---|---|---|
| 2014/0013893 A1* | 1/2014 | Asano | ................... | B25J 18/00 74/490.02 |
| 2014/0060229 A1* | 3/2014 | Chen | ................ | H01L 21/67742 74/490.01 |
| 2015/0000453 A1* | 1/2015 | Oda | ................... | B25J 19/002 74/490.01 |
| 2015/0122062 A1* | 5/2015 | Kawauchi | ............... | F16H 25/24 74/89.36 |
| 2015/0352720 A1* | 12/2015 | Iizuka | ................... | B25J 9/1682 700/245 |
| 2016/0107314 A1* | 4/2016 | Takemoto | .............. | B25J 9/1674 74/490.01 |
| 2016/0167229 A1* | 6/2016 | Hosek | ................... | B25J 9/042 700/248 |

FOREIGN PATENT DOCUMENTS

| | | | |
|---|---|---|---|
| CN | 102300681 | A | 12/2011 |
| CN | 102985235 | A | 3/2013 |
| CN | 103386684 | A | 11/2013 |
| DE | 10 2007 062 245 | A1 | 6/2009 |
| EP | 1 323 503 | A2 | 7/2003 |
| EP | 1 810 795 | A1 | 7/2007 |
| JP | H5-304198 | A | 11/1993 |
| JP | H6-278081 | A | 10/1994 |
| JP | 2010131676 | A | 6/2010 |
| TW | 200539996 | A | 12/2005 |

\* cited by examiner

MECHANICAL ARM AND PICKUP DEVICE

FIELD OF THE INVENTION

The present invention belongs to the technical field of carrying devices, and particularly relates to a mechanical arm and a pickup device including the mechanical arm.

BACKGROUND OF THE INVENTION

In a process of manufacturing liquid crystal displays, substrates need to be moved or carried from one worktable to another. The substrates are usually held and carried by a substrate box, and on the substrate box, the substrates are loaded, unloaded and picked up by a mechanical arm.

When picking up the substrates, the mechanical arm is usually controlled by a control unit to start picking up the lowest substrate in the substrate box. A position sensor is arranged at a side of the mechanical arm close to the substrates, for sensing the position of the mechanical arm and notifying the control unit of the sensed position, so that the control unit is able to control the mechanical arm to pick up the substrates.

At least the following problem exists in the prior art: when the position of the mechanical arm sensed by the sensor is incorrect, the mechanical arm will collide with the substrates, resulting in breakage of the substrates and/or damage to the mechanical arm.

SUMMARY OF THE INVENTION

Aiming at the above problem of the existing mechanical arm, the technical solutions of the present invention are proposed, and according to an exemplary embodiment of the present invention, a mechanical arm with higher safety performance and a pickup device including the mechanical arm are provided.

According to one aspect of the present invention, a mechanical arm is provided, including a mechanical arm body and a pressure sensing system. The pressure sensing system is fixedly connected with the mechanical arm body, for sensing whether the mechanical arm body is to be collided with a picked-up object.

Since substrates are placed in a substrate box in a stacked manner, when position information sent by a control unit to the mechanical arm is inaccurate, the mechanical arm will collide with the substrates, resulting in breakage of the substrates and/or failure of the mechanical arm. According to the mechanical arm in an exemplary embodiment of the present invention, since a pressure sensing system is used in the mechanical arm, even if the position information sent by the control unit to the mechanical arm is inaccurate, the pressure sensing system fixedly connected with the mechanical arm body will collide with the substrates before the mechanical arm body, and will sense a pressure generated by the collision, so as to drive the mechanical arm to immediately stop operating. Thus the pressure sensing system can guarantee the safety of the substrates and the mechanical arm.

According to an exemplary embodiment, the pressure sensing system may be a pressure sensor having a telescopic structure, and when the pressure sensor collides with the picked-up object, the pressure sensor may move in a direction opposite to the movement direction of the mechanical arm.

According to an exemplary embodiment, the mechanical arm may further include a buffering system. The buffering system may be fixedly connected with the mechanical arm body, and an end of the buffering system close to the picked-up object may be aligned to an end of the pressure sensor close to the picked-up object.

According to an exemplary embodiment, the mechanical arm may further include a protective cap. The protective cap may be fixedly connected with the end of the buffering system close to the picked-up object and may be in contact with the end of the pressure sensor close to the picked-up object.

According to an exemplary embodiment, the buffering system may be a hydraulic buffer or cylinder.

According to an exemplary embodiment, the mechanical arm body may have a hollow structure, and an opening may be formed in an end of the mechanical arm body close to the picked-up object. The pressure sensing system and the buffering system may be fixed in the hollow structure of the mechanical arm body through the opening.

According to an exemplary embodiment, the material of the protective cap may be plastic.

According to an exemplary embodiment, the picked-up object may be a substrate.

According to another aspect of the present invention, a pickup device is provided, including the mechanical arm according to the present invention.

According to an exemplary embodiment, the pickup device may further include a control unit. The control unit may control the mechanical arm to stop operating according to a sensed pressure signal from the pressure sensing system.

According to an exemplary embodiment, the control unit may be a PLC.

DETAILED DESCRIPTION OF THE EMBODIMENTS

In order that those skilled in the art can better understand the technical solutions of the present invention, a further detailed description of the specific implementations of the present invention will be given below in combination with the accompanying drawings. However, the present invention is not limited to the shown specific implementations, but includes a variety of modifications and variations of the shown specific implementations, which can be made according to the teachings of the present invention.

Figure 1:
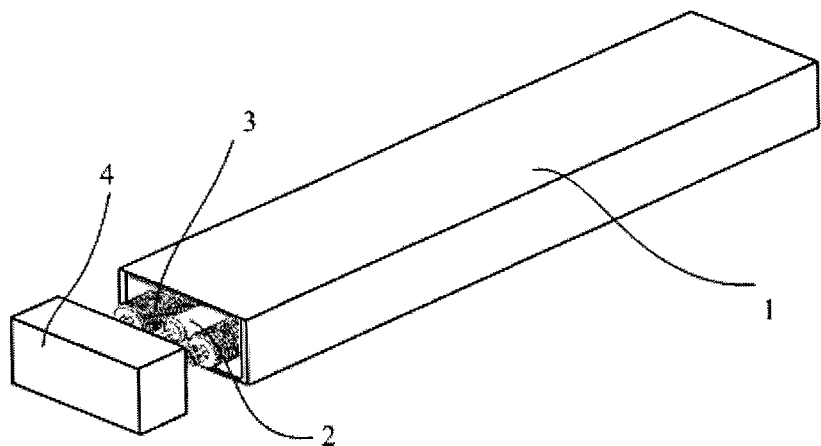
FIG. 1 is a schematic diagram of a mechanical arm according to an exemplary embodiment.
Figure 2:
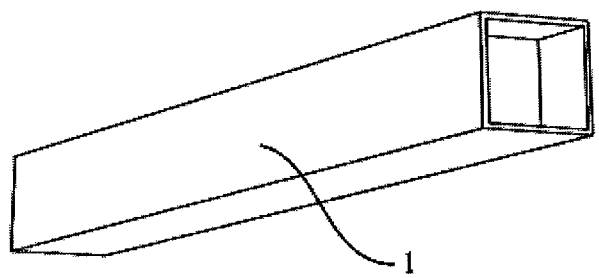
FIG. 2 is a schematic diagram of a mechanical arm body of the mechanical arm according to an exemplary embodiment.
Figure 3:
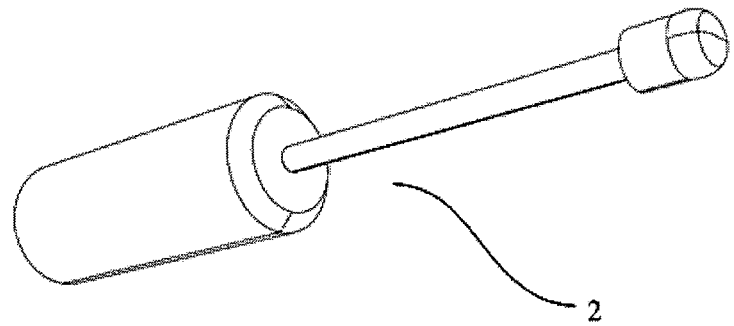
FIG. 3 is a schematic diagram of a pressure sensing system of the mechanical arm according to an exemplary embodiment.

FIG. 1 is a schematic diagram of a mechanical arm according to an exemplary embodiment, FIG. 2 is a schematic diagram of a mechanical arm body of the mechanical arm according to an exemplary embodiment, and FIG. 3 is a schematic diagram of a pressure sensing system of the mechanical arm according to an exemplary embodiment.

With reference to FIGS. 1 to 3, the mechanical arm according to an exemplary embodiment includes a mechanical arm body 1 and a pressure sensing system 2. The pressure sensing system 2 is fixedly connected with the mechanical arm body 1, for sensing whether the mechanical arm body 1 is to be collided with a picked-up object. According to an embodiment, the picked-up object may be a substrate.

Since substrates are placed in a substrate box in a stacked manner, when position information sent by a control unit to the mechanical arm is inaccurate, the mechanical arm will collide with the substrates, resulting in breakage of the substrates and/or failure of the mechanical arm. Since the mechanical arm according to the present embodiment utilizes the pressure sensing system 2, even if the position information sent by the control unit to the mechanical arm is inaccurate, the pressure sensing system 2 fixedly connected with the mechanical arm body 1 will collide with the substrates before the mechanical arm body 1, and will sense a pressure generated by the collision. The pressure sensing system 2 then immediately send the sensed pressure signal to the control unit so as to drive the mechanical arm to stop operating. Thus the safety of the substrates and the mechanical arm can be guaranteed.

It should be noted that, the pressure sensing system 2 will generate the pressure signal as long as being in contact with the picked-up object (for example, the substrate). In addition, the contact of the pressure sensing system 2 and the substrate should not damage the substrate.

According to an exemplary embodiment, the pressure sensing system 2 may be a pressure sensor having a telescopic structure. When colliding with the substrate, the pressure sensor may move in a direction opposite to the movement direction of the mechanical arm. That is, after colliding with the substrate, the pressure sensor moves in a direction away from the substrate. The telescopic structure of the pressure sensor can solve the problem that after the control unit controls the mechanical arm to stop moving, the mechanical arm continues to move due to inertia to break the substrate.

Figure 4:
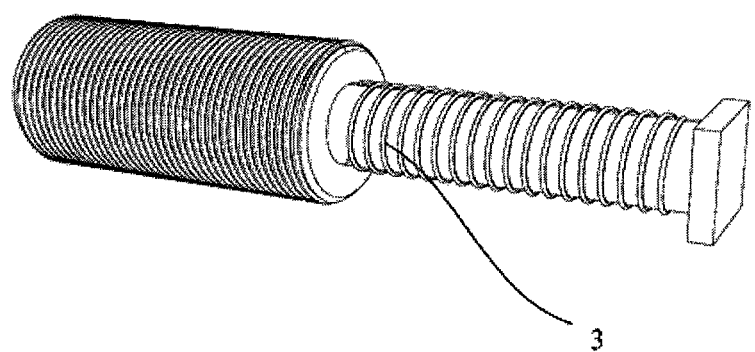
FIG. 4 is a schematic diagram of a buffering system of the mechanical arm according to an exemplary embodiment.

According to an exemplary embodiment, the mechanical arm may further include a buffering system 3. FIG. 4 is a schematic diagram of the buffering system of the mechanical arm according to the exemplary embodiment.

As shown in FIG. 4, the buffering system 3 is fixedly connected with the mechanical arm body 1, and an end of the buffering system 3 close to the picked-up object (for example, the substrate) is aligned to an end of the pressure sensor close to the picked-up object.

After the mechanical arm collides with the picked-up object (for example, the substrate), even if the control unit controls the mechanical arm to stop moving, but due to inertia, the mechanical arm may continue to move. The buffering system 3 may alleviate the problem that the mechanical arm continues to move to break the substrate and/or cause failure of the mechanical arm.

According to an exemplary embodiment, the buffering system 3 may be a hydraulic buffer or cylinder. However, the present invention is not limited to these two buffering devices, but may include any device with a buffering function.

Figure 5:
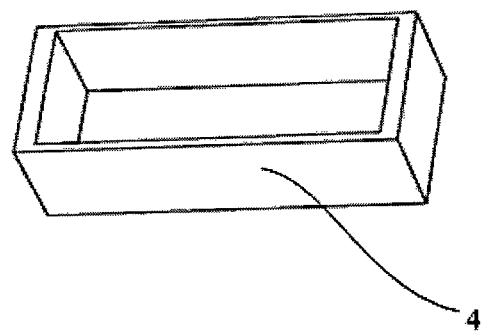
FIG. 5 is a schematic diagram of a protective cap of the mechanical arm according to an exemplary embodiment.

According to the exemplary embodiment, the mechanical arm may further include a protective cap 4. FIG. 5 is a schematic diagram of the protective cap of the mechanical arm according to the exemplary embodiment.

As shown in FIG. 5, the protective cap 4 is fixedly connected with the end of the buffering system 3 close to the picked-up object (for example, the substrate) and is in contact with the end of the pressure sensor close to the picked-up object, so that the protective cap 4 can increase a contact area of the pressure sensor and the picked-up object in case of collision. Since the contact area is increased, a pressure generated per unit area can be decreased to reduce the damage probability of the substrate in case of collision and at the same time protect the buffering system 3 and the pressure sensor from being damaged. According to an exemplary embodiment, the material of the protective cap may be plastic, such that the damage to the substrate is further avoided in case of collision. However, the present invention is not limited hereto, and the material of the protective cap 4 may also be such materials with lower hardness, such as rubber, etc.

According to an exemplary embodiment, the mechanical arm body 1 may have a hollow structure to reduce the weight of the mechanical arm. As shown in FIG. 1, an opening is formed in an end of the mechanical arm body 1 close to the picked-up object (for example, the substrate). The pressure sensing system 2 and the buffering system 3 are fixed in the hollow structure of the mechanical arm body 1 through the opening of the mechanical arm body 1. It should be understood that, the pressure sensing system 2 and the buffering system 3 should not be completely accommodated in the hollow structure of the mechanical arm body 1, while a sensing end of the pressure sensing system 2 and a buffering end of the buffering system 3 are exposed at outside of the mechanical arm body 1 through the opening and are close to the picked-up object.

It should be noted that, compared with other substrates, a glass substrate is easier to be broken by a collision, therefore the mechanical arm according to exemplary embodiments of the present invention is particularly suitable for picking up the glass substrate.

In addition, although the application manner of the mechanical arm according to the present invention is illustrated with the substrate as an example, the picked-up object capable of being picked up by the mechanical arm according to the present invention is not limited to the substrate.

The mechanical arm according to the present invention can be applied to a variety of pickup devices.

Since utilizing the mechanical arm according to the present invention, the safety performance of the pickup device is perfect and the practicality of the pickup device is improved.

According to an exemplary embodiment, the pickup device may include a control unit used for receiving the pressure signal sensed by the pressure sensing system of the mechanical arm. After receiving the pressure signal (i.e., after the mechanical arm collides with the picked-up object), the control unit controls the mechanical arm to stop operating. According to an exemplary embodiment, the control unit may be a PLC (Programmable Logic Controller).

It should be understood that, the foregoing implementations are merely exemplary implementations used for illustrating the principle of the present invention, but the present invention is not limited hereto. Those of ordinary skill in the art can make various variations and improvements without departing from the spirit and essence of the present invention, and these variations and improvements shall fall within the protection scope of the present invention.

The invention claimed is:

1. A mechanical arm, comprising a mechanical arm body and a pressure sensing system, wherein the pressure sensing system is fixedly connected with the mechanical arm body, for sensing collision of the mechanical arm body with a picked-up object, and the pressure sensing system is a pressure sensor having a telescopic structure, and when the pressure sensor collides with the picked-up object, the pressure sensor moves in a direction opposite to a movement direction of the mechanical arm.

2. The mechanical arm of claim 1, further comprising a buffering system, wherein the buffering system is fixedly connected with the mechanical arm body, and an end of the buffering system on a side of the picked-up object is aligned to an end of the pressure sensor on a side of the picked-up object.

3. The mechanical arm of claim 2, further comprising a protective cap, wherein the protective cap is fixedly connected with the end of the buffering system on a side of the picked-up object and is in contact with the end of the pressure sensor on a side of the picked-up object.

4. The mechanical arm of claim 2, wherein the buffering system is a hydraulic buffer.

5. The mechanical arm of claim 2, wherein the mechanical arm body has a hollow structure, an opening is formed in an end of the mechanical arm body on a side of the picked-up object, and the pressure sensing system and the buffering system are fixed in the hollow structure of the mechanical arm body through the opening.

6. The mechanical arm of claim 3, wherein the material of the protective cap is plastic.

7. The mechanical arm of claim 3, wherein the picked-up object is a substrate.

8. A pickup device, comprising a mechanical arm, wherein the mechanical arm comprises a mechanical arm body and a pressure sensing system, the pressure sensing system is fixedly connected with the mechanical arm body, for sensing collision of the mechanical arm body with a picked-up object, and the pressure sensing system is a pressure sensor having a telescopic structure, and when the pressure sensor collides with the picked-up object, the pressure sensor moves in a direction opposite to a movement direction of the mechanical arm.

9. The pickup device of claim 8, wherein the mechanical arm further comprises a buffering system, and the buffering system is fixedly connected with the mechanical arm body, and an end of the buffering system on a side of the picked-up object is aligned to an end of the pressure sensor on a side of the picked-up object.

10. The pickup device of claim 9, wherein the mechanical arm further comprises a protective cap, and the protective cap is fixedly connected with the end of the buffering system on a side of the picked-up object and is in contact with the end of the pressure sensor on a side of the picked-up object.

11. The pickup device of claim 9, wherein the buffering system is a hydraulic buffer.

12. The pickup device of claim 9, wherein the mechanical arm body is has a hollow structure, an opening is formed in an end of the mechanical arm body on a side of the picked-up object, and the pressure sensing system and the buffering system are fixed in the hollow structure of the mechanical arm body through the opening.

13. The pickup device of claim 10, wherein the material of the protective cap is plastic.

14. The pickup device of claim 8, wherein the picked-up object is a substrate.

15. The pickup device of claim 8, further comprising a control unit, wherein the control unit controls the mechanical arm to stop operating according to a sensed pressure signal from the pressure sensing system.

16. The pickup device of claim 15, wherein the control unit is a PLC.

17. The mechanical arm of claim 2, wherein the buffering system is a cylinder.

18. The pickup device of claim 9, wherein the buffering system is a cylinder.

* * * * *